US012495911B2

(12) United States Patent
Xia et al.

(10) Patent No.: US 12,495,911 B2
(45) Date of Patent: Dec. 16, 2025

(54) SPONGE, AIR MATTRESS, AND SPONGE FABRICATION PROCESS

(71) Applicant: Zhejiang Natural Outdoor Goods Inc., Taizhou (CN)

(72) Inventors: Yonghui Xia, Taizhou (CN); Junwei Yao, Taizhou (CN); Jing Guo, Taizhou (CN); Enhui Liu, Taizhou (CN)

(73) Assignee: Zhejiang Natural Outdoor Goods Inc., Taizhou (CN)

( * ) Notice: Subject to any disclaimer, the term of this patent is extended or adjusted under 35 U.S.C. 154(b) by 147 days.

(21) Appl. No.: 18/415,701

(22) Filed: Jan. 18, 2024

(65) Prior Publication Data

US 2025/0194822 A1 Jun. 19, 2025

(30) Foreign Application Priority Data

Dec. 14, 2023 (CN) ......................... 202311726681.5

(51) Int. Cl.
*A47C 27/08* (2006.01)
*A47C 27/14* (2006.01)
*B26D 3/10* (2006.01)

(52) U.S. Cl.
CPC .......... *A47C 27/088* (2013.01); *A47C 27/081* (2013.01); *A47C 27/146* (2013.01); *B26D 3/10* (2013.01); *A47C 27/142* (2013.01)

(58) Field of Classification Search
CPC ..... A47C 27/088; A47C 27/081; A47C 27/14; A47C 27/241; A47C 27/146; A47C 27/18; A47C 27/142; B62D 3/10; B26D 3/10
USPC .......................... 5/709, 740, 655.9, 652, 953
See application file for complete search history.

(56) References Cited

U.S. PATENT DOCUMENTS 3,512,190 A * 5/1970 Buff ..................... A47C 27/146 5/730
3,675,377 A * 7/1972 Suter ......................... B63B 7/08 206/522
3,828,378 A * 8/1974 Flam .................. A61G 7/05707 5/730
3,872,525 A * 3/1975 Lea ...................... A47C 27/088 5/709
4,025,974 A * 5/1977 Lea ..................... B29C 66/8181 5/709

(Continued)

FOREIGN PATENT DOCUMENTS

WO WO-2020210091 A1 * 10/2020 ............. B32B 5/245

*Primary Examiner* — Robert G Santos
(74) *Attorney, Agent, or Firm* — Bayramoglu Law Offices LLC

(57) ABSTRACT

A sponge, an air mattress, and a sponge fabrication process are provided. The sponge is provided with cutting seams. When an external force is applied, the sponge is expanded, and gaps are formed. The gaps are equivalent to holes of an existing sponge block formed by a conventional vertical punching method. Compared to an air mattress that requires punching the entire sponge, the air mattress only requires cutting the sponge without punching holes, such that corresponding gaps (i.e., corresponding conventional holes) are formed when the sponge is expanded by an external force. After the sponge is combined with an air mattress body, a corresponding pattern is formed. The sponge avoids waste materials formed by punching holes, and is environmentally friendly.

13 Claims, 19 Drawing Sheets

(56) References Cited

U.S. PATENT DOCUMENTS

| | | | | | |
|---|---|---|---|---|---|
| 4,042,987 | A * | 8/1977 | Rogers | A47C 27/15 | 5/730 |
| 4,110,881 | A * | 9/1978 | Thompson | A47C 27/146 | 5/730 |
| 4,149,919 | A * | 4/1979 | Lea | B29C 66/0342 | 156/213 |
| 4,261,776 | A * | 4/1981 | Lea | A47C 27/088 | 156/213 |
| RE31,898 | E * | 5/1985 | Suter | B65D 90/02 | 428/317.1 |
| 4,624,877 | A * | 11/1986 | Lea | A47C 27/088 | 156/303.1 |
| 4,688,283 | A * | 8/1987 | Jacobson | A47C 27/10 | 5/709 |
| 4,862,538 | A * | 9/1989 | Spann | A61G 7/05707 | 5/736 |
| 4,903,359 | A * | 2/1990 | Rogers | A47C 27/148 | 5/730 |
| 5,025,519 | A * | 6/1991 | Spann | A61G 7/05707 | 5/724 |
| 5,101,527 | A * | 4/1992 | Wadsworth, III | A47C 27/15 | 5/699 |
| 5,127,119 | A * | 7/1992 | Rogers | A47C 27/15 | 5/730 |
| 5,201,780 | A * | 4/1993 | Dinsmoor, III | A61G 7/05715 | 5/679 |
| 5,252,278 | A * | 10/1993 | Spann | A61G 7/05707 | 83/13 |
| 5,255,404 | A * | 10/1993 | Dinsmoor, III | A47C 27/144 | 5/680 |
| 5,303,436 | A * | 4/1994 | Dinsmoor, III | A47C 27/148 | 5/719 |
| 5,511,260 | A * | 4/1996 | Dinsmoor, III | A47C 27/148 | 5/676 |
| 5,580,504 | A * | 12/1996 | Spann | A61G 7/05707 | 83/13 |
| 5,737,788 | A * | 4/1998 | Castellino | A47C 27/085 | 5/655.5 |
| 6,190,486 | B1 * | 2/2001 | Switlik | A47C 27/084 | 156/308.2 |
| 6,256,819 | B1 * | 7/2001 | Maier | A61G 7/05715 | 5/653 |
| 6,397,417 | B1 * | 6/2002 | Switlik | A47C 27/148 | 5/709 |
| 6,442,780 | B1 * | 9/2002 | Phillips | A47C 27/146 | 5/730 |
| 6,874,185 | B1 * | 4/2005 | Phillips | A61G 7/05707 | 5/730 |
| 7,100,229 | B2 * | 9/2006 | O'Reagan | A47C 27/148 | 5/736 |
| 11,896,138 | B2 * | 2/2024 | Jacot | A47C 31/105 | |
| 12,349,801 | B2 * | 7/2025 | Jacot | B32B 3/30 | |
| 12,349,802 | B2 * | 7/2025 | Jacot | B32B 5/024 | |
| 2005/0044635 | A1 * | 3/2005 | O'Reagan | A47C 27/148 | 5/736 |
| 2020/0323355 | A1 * | 10/2020 | Jacot | A47C 27/148 | |
| 2023/0172366 | A1 * | 6/2023 | Jacot | B32B 27/12 | 5/709 |
| 2024/0164539 | A1 * | 5/2024 | Jacot | B32B 27/065 | |
| 2025/0194822 | A1 * | 6/2025 | Xia | B26D 3/10 | |

* cited by examiner

SPONGE, AIR MATTRESS, AND SPONGE FABRICATION PROCESS

CROSS REFERENCE TO THE RELATED APPLICATIONS

This application is based upon and claims priority to Chinese Patent Application No. 202311726681.5, filed on Dec. 14, 2023, the entire contents of which are incorporated herein by reference.

TECHNICAL FIELD

The present disclosure belongs to the technical field of fluid mattresses, and in particular relates to a sponge, an air mattress, and a sponge fabrication process.

BACKGROUND

An existing air mattress is filled with a layer of sponge inside, making the air mattress more comfortable and warmer than an air mattress without the sponge filling. However, since the entire layer of sponge is arranged in the air mattress, the weight of the air mattress is greatly increased, making it inconvenient to use.

In order to reduce the weight of the air mattress and improve the comfort of use, the sponge inside the air mattress can be vertically punched to form holes, and the formed holes are matched with corresponding positions of the sponge to provide different patterns. Due to these holes, the weight of the air mattress is reduced at the same area, providing more choices for consumers and making the air mattress easy to carry.

However, in the actual fabrication process, punching holes on the entire sponge for preparing the sponge can cause sponge waste, environmental pollution, and low sponge utilization.

SUMMARY

In order to solve the above-mentioned problems existing in the prior art, an objective of the present disclosure is to provide a sponge, an air mattress, and a sponge fabrication process.

An aspect of the present disclosure provides a sponge, including a sponge body, where the sponge body includes a plurality of geometric sponge blocks that are connected to each other; the sponge body is a whole under a normal condition; and when an external force is applied, some sponge blocks rotate, while the remaining sponge blocks move, to allow the sponge body to expand, and gaps are formed between the plurality of adjacent sponge blocks.

In some implementations, the sponge body is provided with a plurality of cutting seams; the sponge body is divided into the plurality of geometric sponge blocks through the cutting seams; and there is at least one connecting part between each two adjacent sponge blocks. In this way, the sponge body can be divided into a plurality of sponge blocks. When an external force is applied, the sponge blocks expand in all directions to increase an area. The connecting part is configured to connect the two adjacent sponge blocks.

In some implementations, when an external force is applied to expand the sponge body, the plurality of sponge blocks and the gaps form a regular geometric pattern.

In some implementations, the sponge is made of a polyurethane foam material and is suitable for both outdoor and household air mattresses.

Another aspect of the present disclosure provides an expanded sponge. The expanded sponge is bonded onto the fabric to create the gaps between adjacent sponge blocks under the normal condition.

When the expanded sponge is bonded onto the fabric, the gaps are formed, which are equivalent to the holes formed by a conventional vertical punching method.

In some implementations, the sponge body has a density of 14-50 kg/m$^3$.

In some implementations, the sponge body has a thickness of 2.5-25 cm.

Another aspect of the present disclosure further provides an air mattress, including an air mattress body and an expanded sponge, where the sponge is filled in the air mattress body, and the air mattress body is provided with a pattern.

Another aspect of the present disclosure provides a sponge fabrication process, including the following steps:

S1: adjusting a cutting device and a cutting tool, and mounting the cutting tool on the cutting device;

S2: placing an entire piece of sponge under the cutting device, and cutting the sponge by the cutting device; and S3: forming the plurality of cutting seams on the sponge body after cutting.

In some implementations, the sponge fabrication process further includes the following steps:

S4: applying an external force to the sponge body, such that the sponge body is expanded, and the gaps are formed between adjacent sponge blocks; and S5: bonding the expanded sponge body onto a fabric.

The present disclosure has the following beneficial effects:

1. In the present disclosure, the sponge is provided with cutting seams. When an external force is applied, the sponge is expanded, and the gaps are formed, which are equivalent to holes formed by a conventional vertical punching method.

2. Compared to an air mattress that requires punching on the entire sponge, the air mattress in the present disclosure does not require punching. Instead, the present disclosure only requires cutting the sponge and applying an external force to expand the sponge, thereby forming gaps (corresponding to conventional holes). After the sponge of the present disclosure is combined with the air mattress body, a pattern is formed. The present disclosure avoids waste materials formed by punching holes, and is environmentally friendly.

Figure 1:
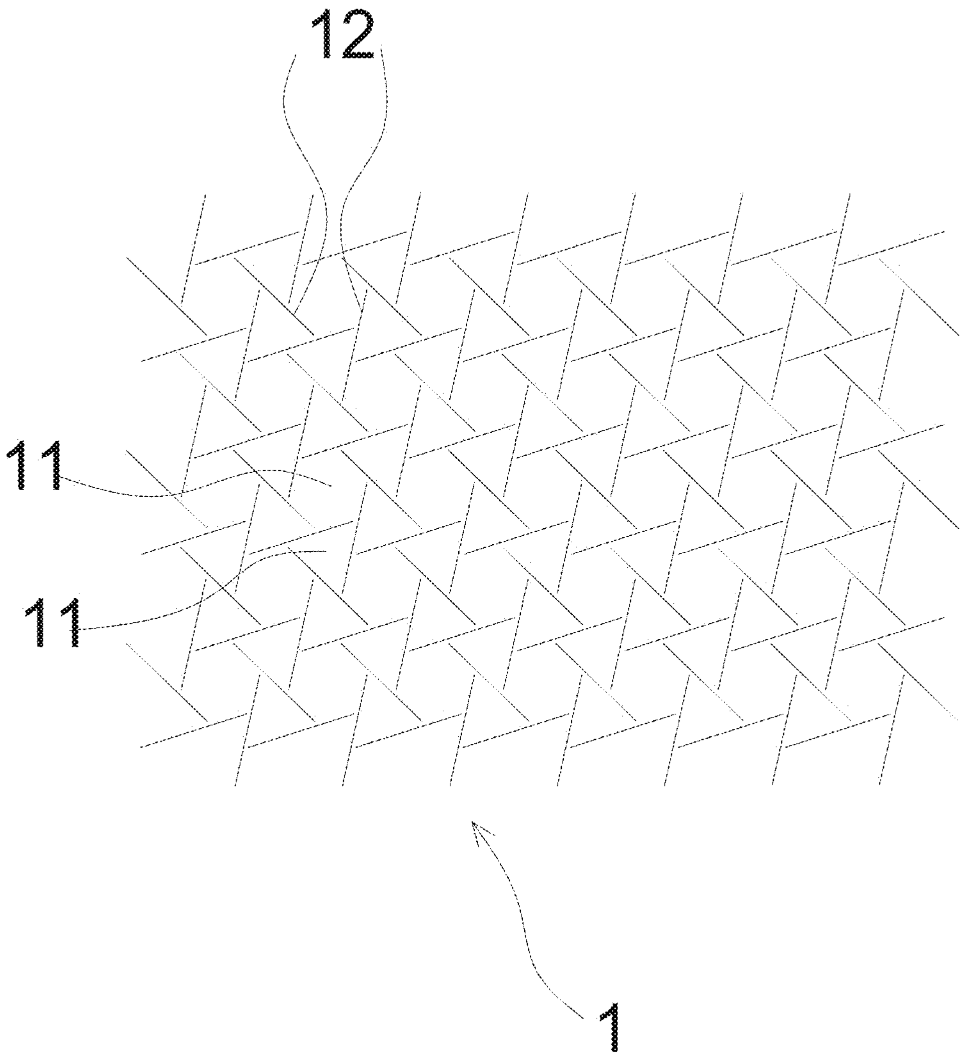
FIG. 1 is a schematic diagram of a sponge according to an implementation of the present disclosure.

Reference Numerals: 1. sponge body; 11. sponge block; and 12. cutting seam.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Unless otherwise defined, all technical and scientific terms used herein have the same meanings as commonly understood by those skilled in the technical field of the present disclosure. The terms used in the specification of the present disclosure herein are only for the purpose of describing specific embodiments, and are not intended to limit the present disclosure. The term "and/or" used herein includes one or more of the associated items listed.

The following is a comprehensive description of the present disclosure.

A sponge includes sponge body 1. The sponge body 1 includes a plurality of geometric sponge blocks 11 that are connected to each other. Under a normal condition, that is, when no external force (including adhesion and other fixing methods) is applied to the sponge body 1, the sponge body 1 is a whole. There is certain elasticity between each two sponge blocks 11, so there is no gap between each two adjacent sponge blocks 11. Specifically, there is no space between each two adjacent sponge blocks 11. When an external force is applied, some sponge blocks 11 rotate, while the remaining sponge blocks 11 move, to allow the sponge body 1 to expand. After the sponge body 1 is expanded, gaps are formed between the plurality of adjacent sponge blocks 11. Specifically, the gaps indicate the spaces formed between each two adjacent sponge blocks 11.

The sponge body 1 is provided with a plurality of cutting seams 12. The sponge body 1 is divided into the plurality of geometric sponge blocks 11 through the cutting seams 12. There is at least one connecting part between each two adjacent sponge blocks 11. In this way, the sponge body 1 can be divided into a plurality of sponge blocks 11. When an external force (such as stretching or pasting) is applied, the sponge blocks 11 expand in all directions to increase an area. The connecting part is configured to connect the two adjacent sponge blocks 11.

The cutting seams are preferably formed by a cutting tool. Of course, other methods can also be used to form the cutting seams. In this way, the cutting seams are formed on the sponge body 1, and after an external force is applied to expand the sponge body 1, the gaps are formed between the plurality of adjacent sponge blocks 11.

Before an external force is applied to the sponge body 1, the cutting seams 12 are fine seams. Regarding the cutting seams 12, there are gaps between each two adjacent sponge blocks 11. After an external force is applied, due to the characteristic of the sponge body 1, the sponge blocks will not fully return. That is to say, after the external force is applied, there are gaps of a certain size formed, with a width ranging between a width of a fully expanded gap and a width of the cutting seam.

When an external force is applied to expand the sponge body 1, the plurality of sponge blocks 11 and the gaps form a regular geometric pattern. The geometric pattern is related to the positions of the cutting seams. In the actual production process, the positions and number of the cutting seams can be calculated and set based on the pattern formed after the sponge body 1 is expanded.

The sponge body 1 is made of a polyurethane foam material and is suitable for both outdoor and household air mattresses. In other embodiments, the sponge body 1 can be made of other materials according to actual usage needs.

Figure 4:
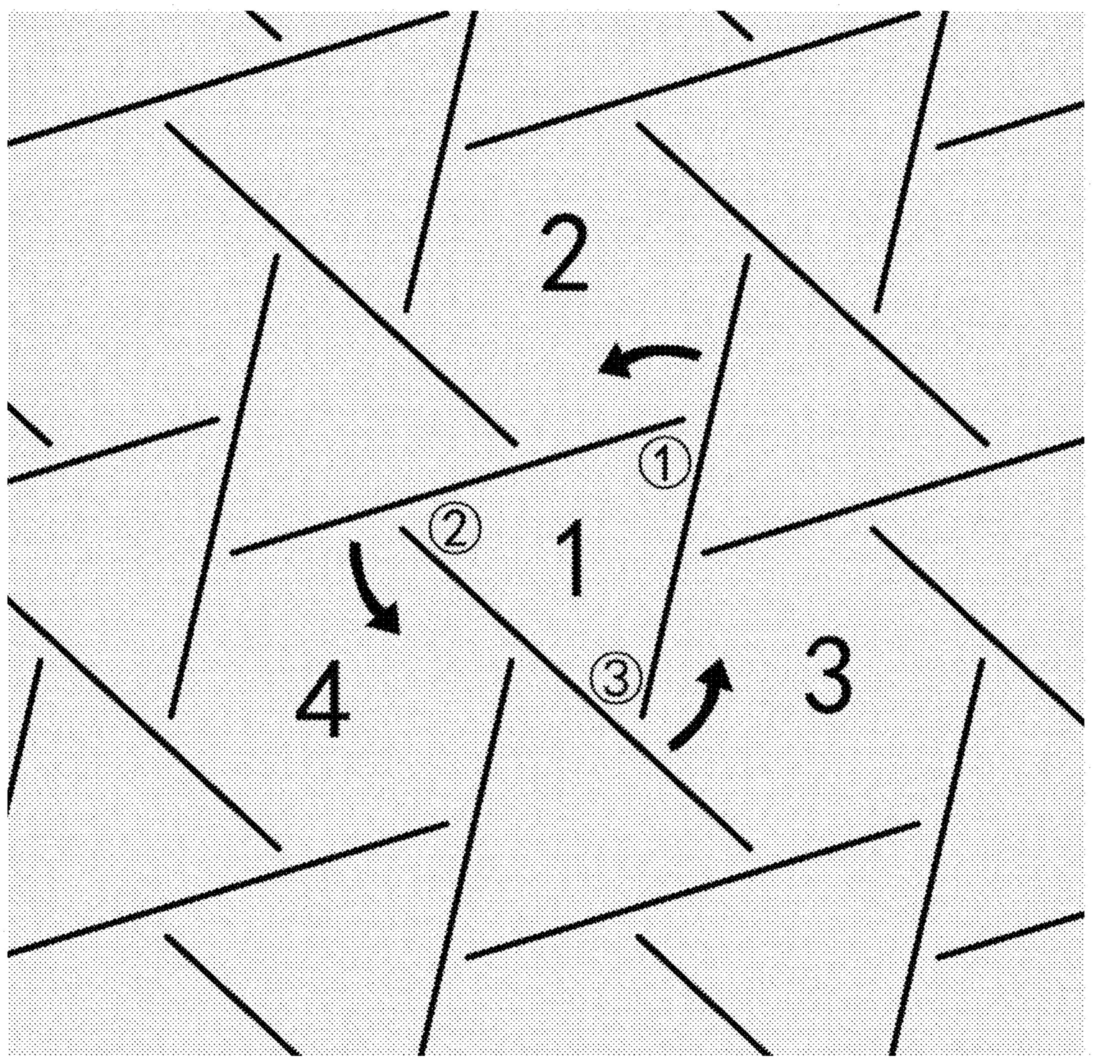
FIGS. 4 to 7 are schematic diagrams of expanding the sponge shown in FIG. 1.

In order to more intuitively demonstrate the sponge of the present disclosure, the present disclosure is described below in conjunction with specific drawings. In order to make the drawings more intuitive, some drawings are presented in gray and white. For example, as shown in FIG. 4, the gray part represents the sponge blocks 11, and the white part represents the gaps.

Embodiment 1

A further detailed description of the present disclosure is provided below according to the specific embodiments shown in FIGS. 1 to 7.

As shown in FIGS. 1 to 7, a specific sponge includes sponge body 1. The sponge body 1 includes triangular sponge blocks 11 and hexagonal sponge blocks 11. Specifically, a plurality of cutting seams are formed on the sponge body 1. Under a normal condition, that is, when there is no external force applied, the sponge body 1 is a whole. That is to say, the sponge blocks 11 of the sponge body 1 are connected to each other and there is no external force applied to the sponge body 1. Due to the elasticity of the sponge blocks 11, the cutting seams 12 have a very small even zero width. When an external force is applied, some sponge blocks 11 rotate, while the remaining sponge blocks 11 move, to allow the sponge body 1 to expand. When the sponge body 1 is expanded, gaps 121 are formed between the plurality of adjacent sponge blocks 11.

Figure 2:
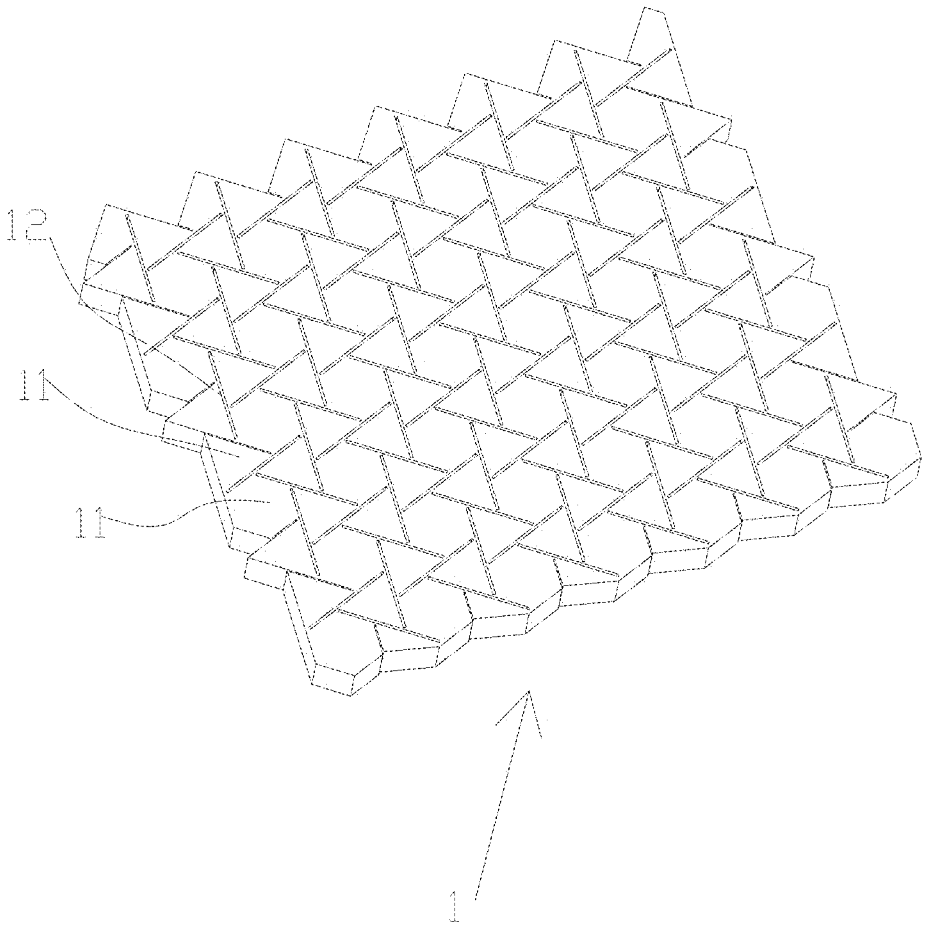
FIG. 2 is a stereoscopic diagram of the sponge shown in FIG. 1.
Figure 3:
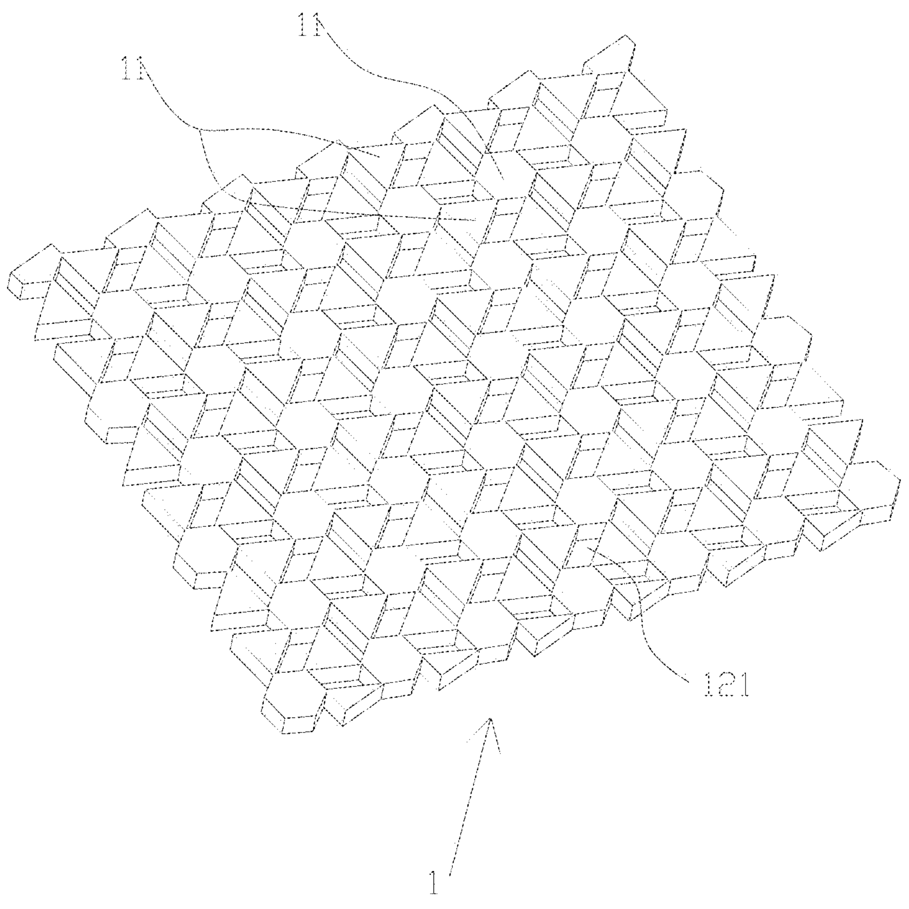
FIG. 3 is a schematic diagram of the sponge shown in FIG. 2 in an expanded state.

According to FIGS. 2 and 3, the cutting seams 12 divide the sponge body 1 into a plurality of geometric sponge blocks 11. According to FIGS. 4 to 7, in this embodiment, every three cutting seams 12 form one triangular sponge block 11. According to FIGS. 2 and 3, every six cutting seams 12 form one hexagonal sponge block 11. Each triangular sponge block 11 is adjacent to three hexagonal sponge blocks 11, and each hexagonal sponge block 11 is adjacent to six triangular sponge blocks 11. When an external force is applied to the sponge body 1, a combination of regularly arranged triangles and hexagons is formed.

There are three connecting parts formed between the triangular sponge block 11 and the adjacent hexagonal sponge blocks 11, denoted ①, ②, and ③ in FIGS. 4 to 7. When an external force is applied, the sponge blocks 11 expand in all directions, thereby increasing an area. The connecting parts are configured to connect each two adjacent sponge blocks 11.

Figure 5:
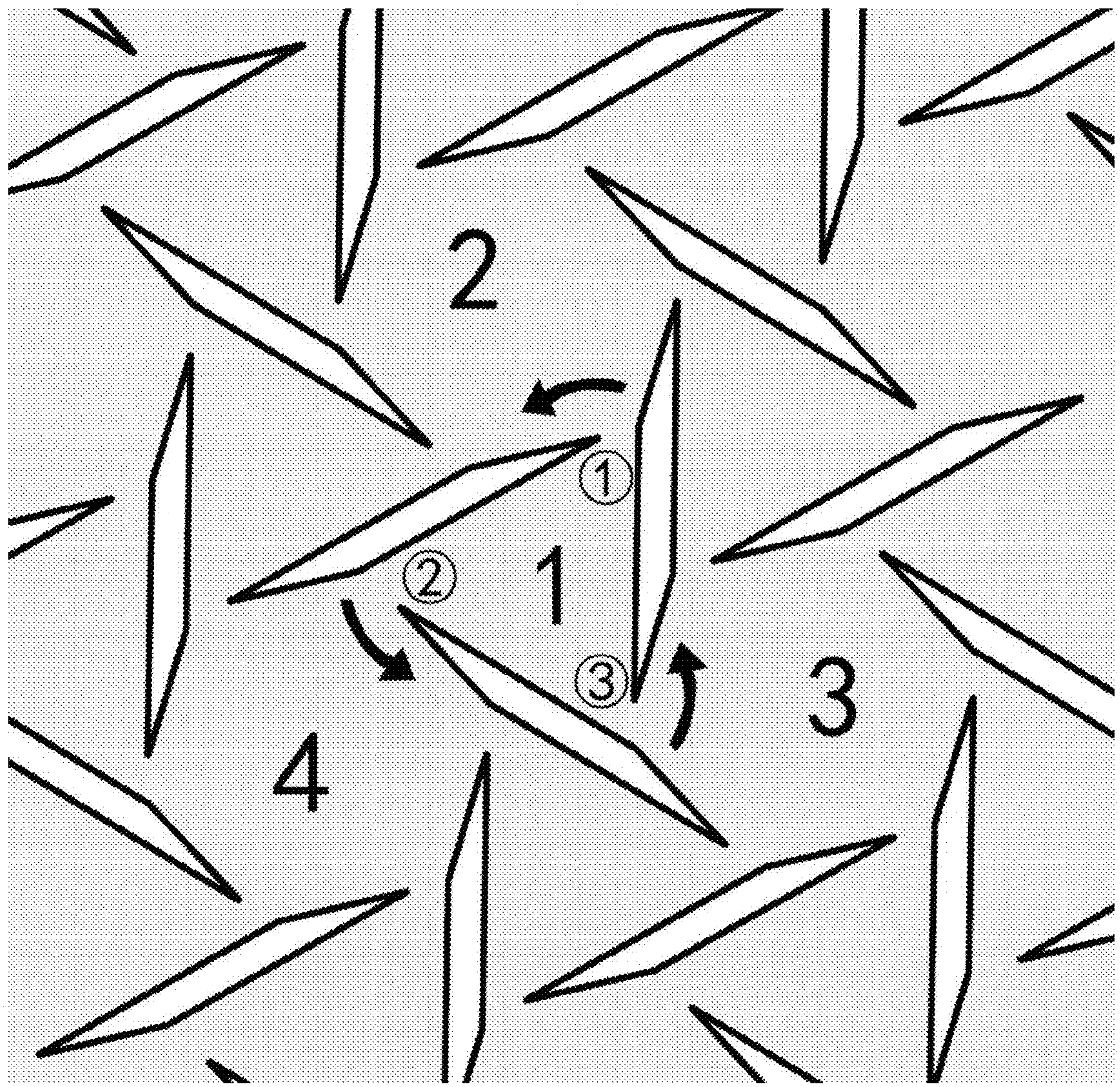
Figure 6:
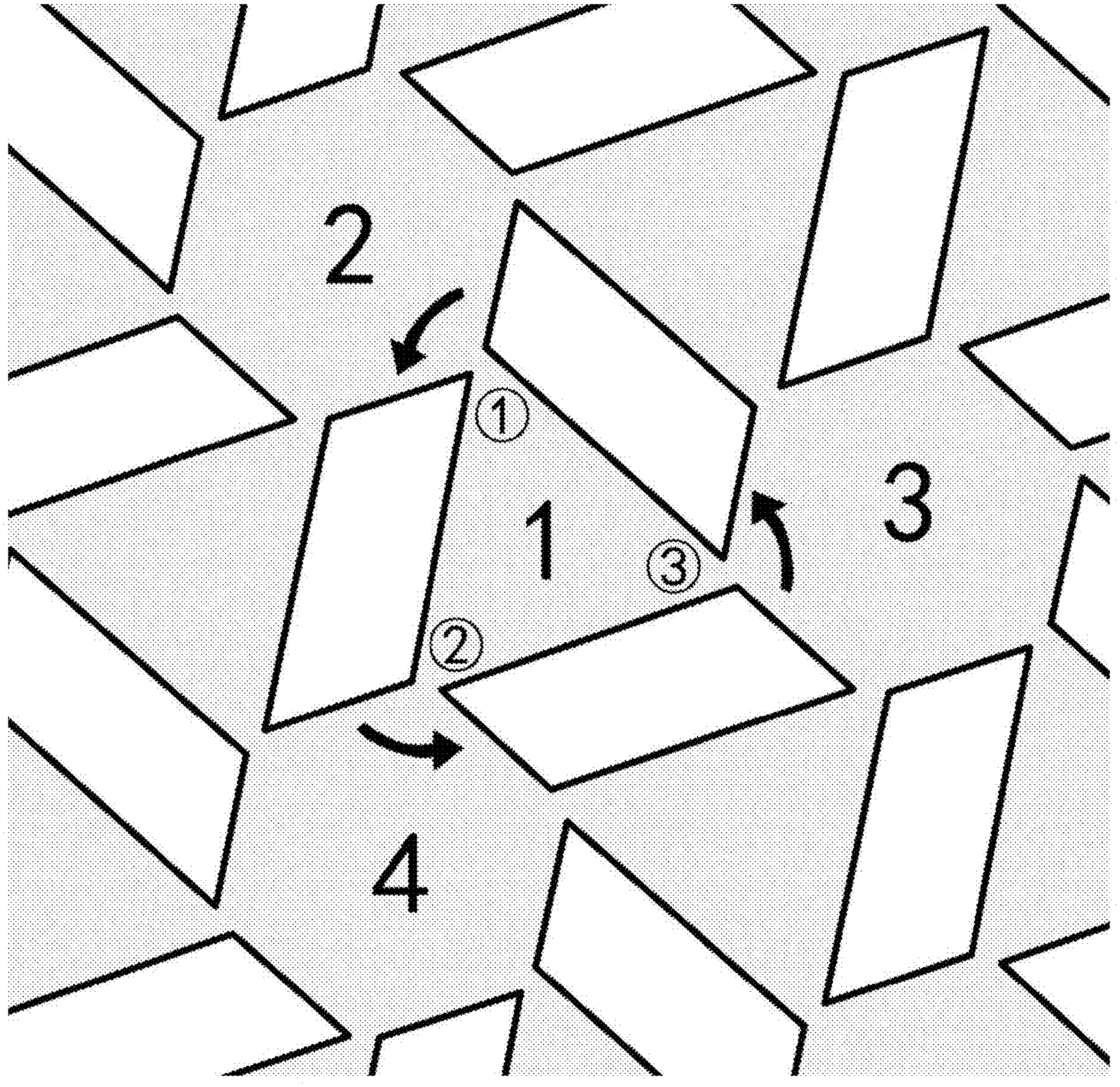
Figure 7:
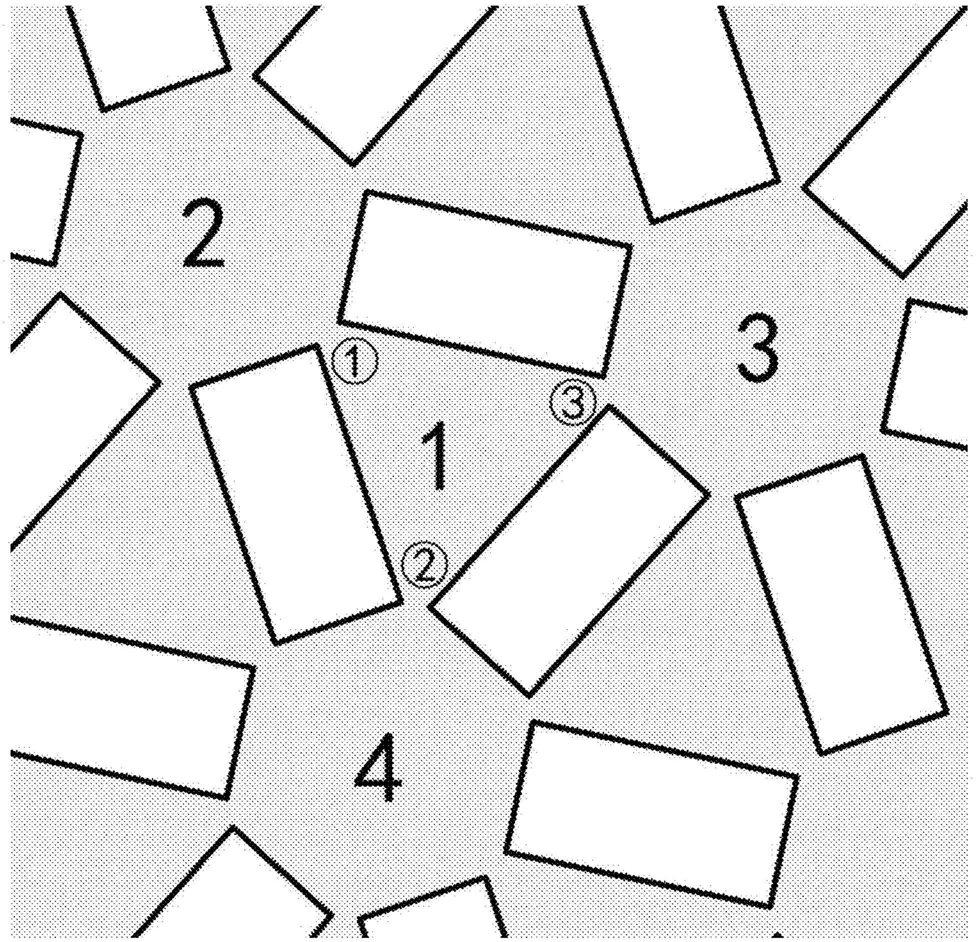
Figure 8:
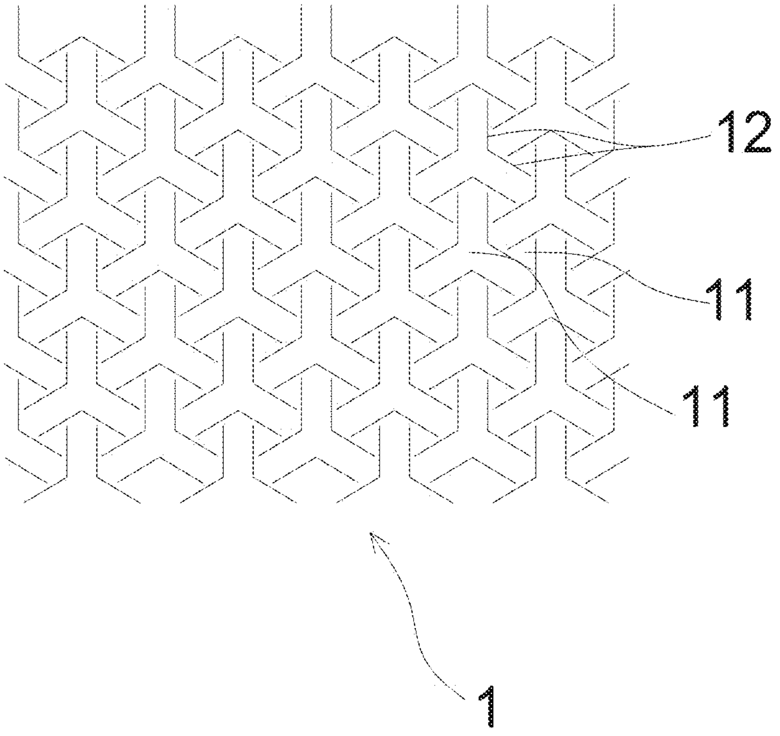
FIG. 8 is a schematic diagram of a sponge according to another implementation of the present disclosure.

As shown in FIGS. 4 to 7, a counterclockwise rotating external force is applied to expand the plurality of sponge blocks 11 according to a sequence shown in FIGS. 4 to 7. FIG. 7 is a schematic diagram of the sponge blocks in a fully expanded state, while FIGS. 5 and 6 are schematic diagrams of the sponge blocks during the expanding process. The plurality of sponge blocks 11 and the gaps form a regular geometric pattern, as shown in FIG. 3. Three corners of the triangular sponge block 11 each are connected to one hexagonal sponge block 11 through the connecting part. Six corners of the hexagonal sponge block 11 each are connected to one triangular sponge block 11 through the connecting part.

In this embodiment, the sponge body 1 is made of a polyurethane foam material and is suitable for both outdoor and household air mattresses. In other embodiments, the sponge body 1 can be made of other materials according to actual usage needs.

A detailed description of the expanding process of the sponge in the present disclosure is provided below according to FIGS. 4 to 7.

1. Before expanding, as shown in FIG. 4, triangle unit 1 serves as a rotating shaft, connecting points ①, ②, and ③, which are three vertexes of the triangle unit 1, rotate around a center point of the triangle unit 1 in the direction indicated by the arrows. During this process, the hexagonal blocks 2, 3, and 4 connected to the triangle unit move. As shown in FIG. 5, the sides of the triangle unit gradually form quadrilateral gaps (holes).

When the triangle unit 1 rotates to the angle shown in FIG. 6, the quadrilateral gaps (holes) become larger, and the hexagonal blocks 2, 3, and 4 are pushed further.

When the triangle unit 1 rotates to the angle shown in FIG. 7, the quadrilateral holes approach rectangles, and the connecting points ①, ②, and ③ rotate around the triangle unit 1 to reach a fully expanded state. At this point, the number of geometric units per unit area is the smallest, and the area expanded by the sponge blocks 11 is the largest.

Embodiment 2

A further detailed description of the present disclosure is provided below according to the specific embodiments shown in FIGS. 8 to 12.

As shown in FIGS. 8 to 12, a specific sponge includes sponge body 1. The sponge body 1 includes geometric sponge blocks 11 that are connected to each other, specifically, triangular sponge blocks 11 and Y-shaped sponge blocks 11. Specifically, a plurality of cutting seams are formed on the sponge body 1. Under a normal condition, that is, when there is no external force applied, the sponge body 1 is a whole. That is to say, the sponge blocks 11 of the sponge body 1 are connected to each other, and when there is no external force applied to the sponge body 1, the cutting seams have a very small even zero width. When an external force is applied, some sponge blocks 11 rotate, while the remaining sponge blocks 11 move, to allow the sponge body 1 to expand. When the sponge body 1 is expanded, gaps are formed between the plurality of adjacent sponge blocks 11.

According to FIGS. 8 to 12, the cutting seams divide the sponge body 1 into a plurality of geometric sponge blocks 11. In this embodiment, the cutting seams 12 are bent. Every three bent cutting seams 12 form one triangular sponge block 11, and every three bent cutting seams 12 can also form one Y-shaped sponge block 11. Each triangular sponge block 11 is connected to three Y-shaped sponge blocks 11, and each Y-shaped sponge block 11 is connected to three triangular sponge blocks 11. When an external force is applied to the sponge body 1, a combination of regularly arranged triangular sponge block 11 and Y-shaped sponge blocks 11 is formed.

There are three connecting parts formed between the triangular sponge block 11 and the adjacent Y-shaped sponge blocks 11, denoted ①, ②, and ③ in FIGS. 9 to 12. When an external force is applied, the sponge blocks 11 expand in all directions, thereby increasing an area. The connecting parts are configured to connect each two adjacent sponge blocks 11.

Figure 9:
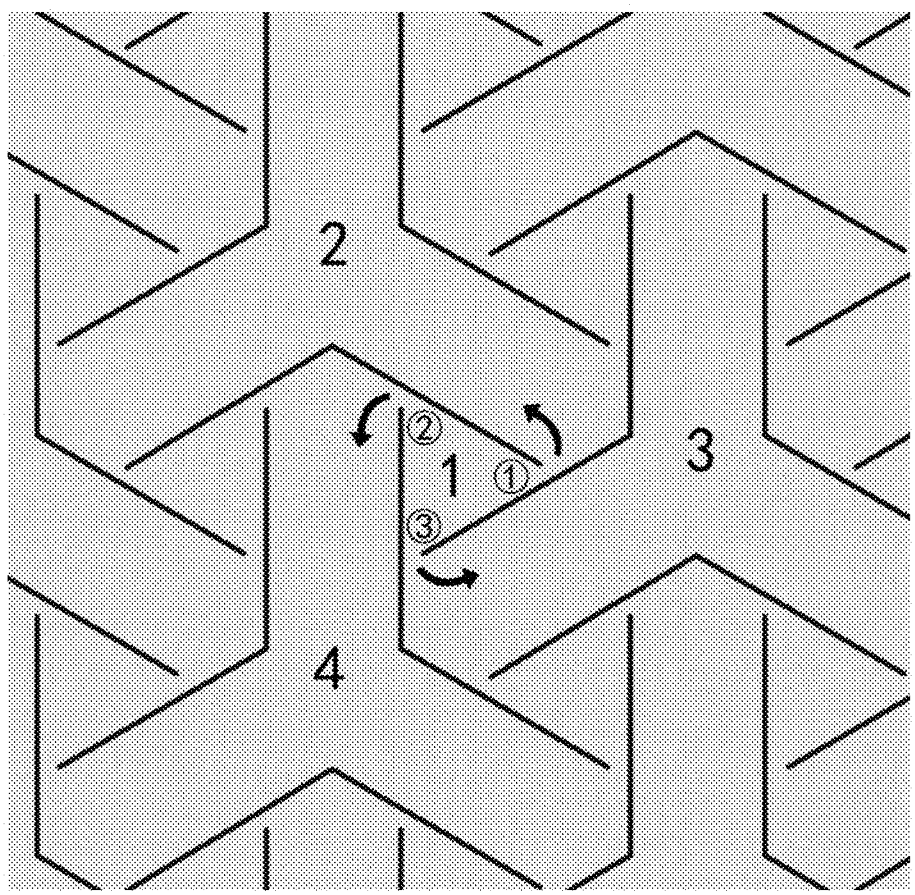
FIGS. 9 to 12 are schematic diagrams of expanding the sponge shown in FIG. 8.
Figure 10:
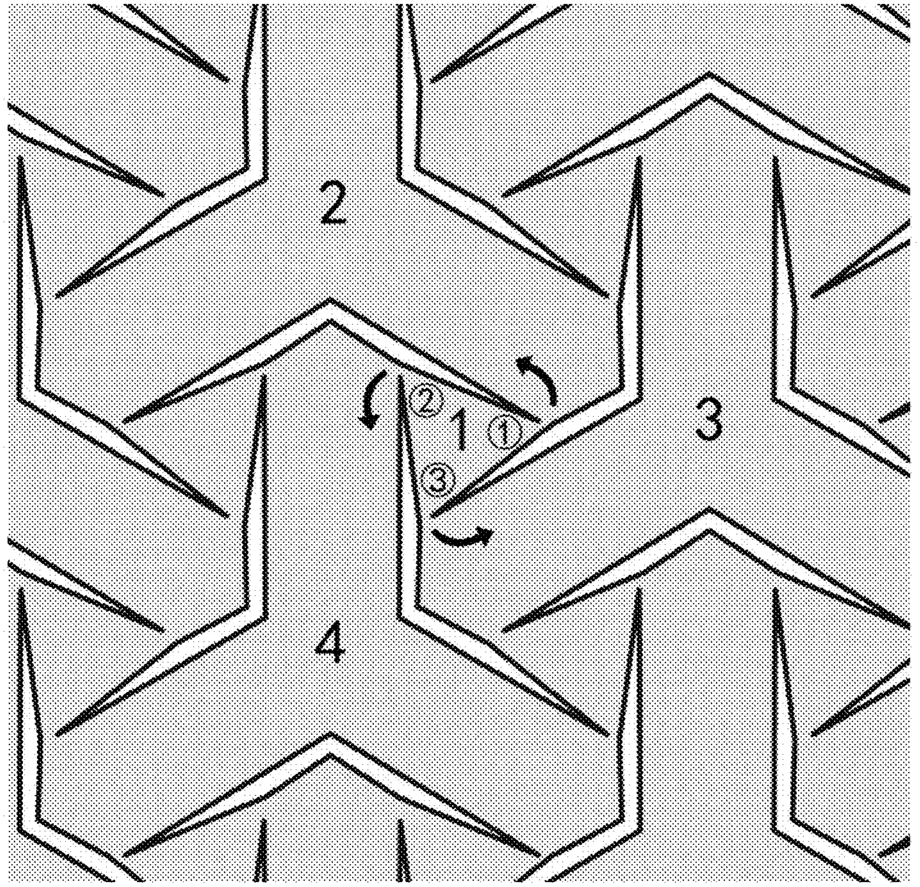
Figure 11:
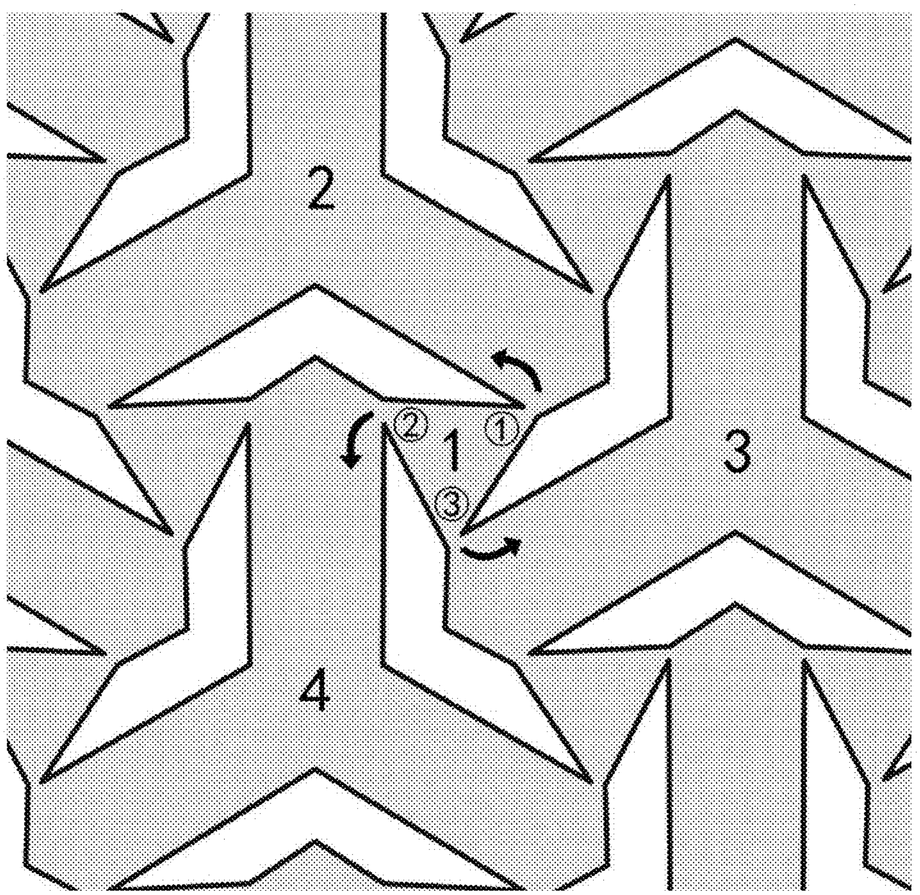
Figure 12:
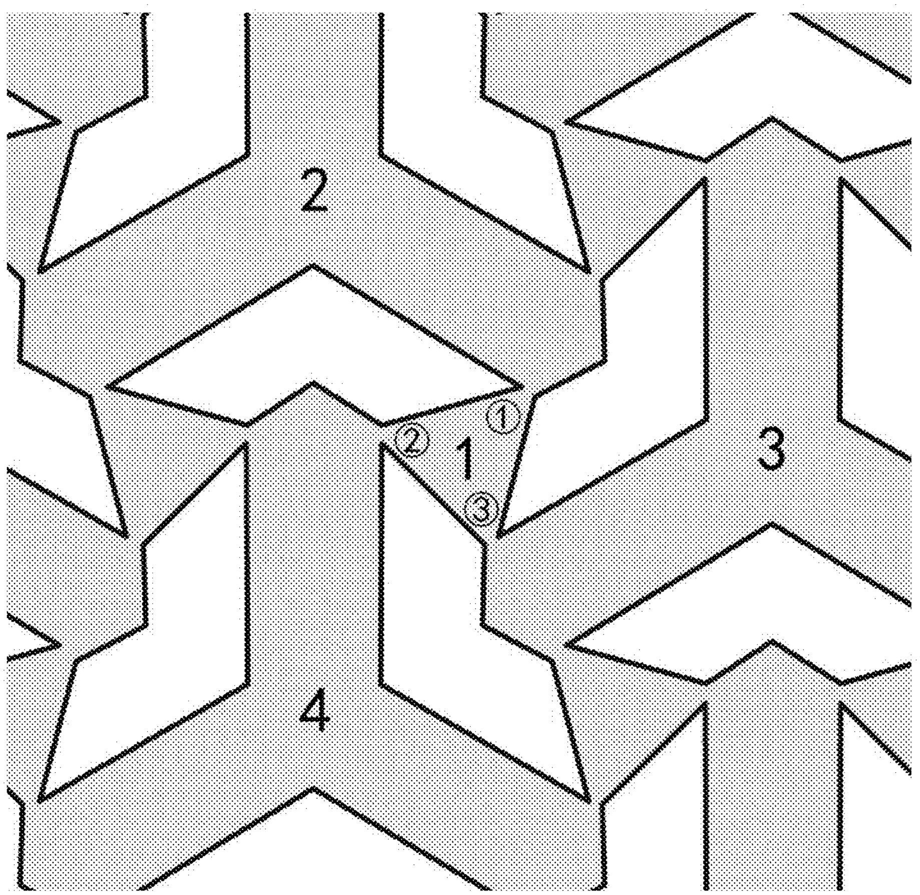
Figure 13:
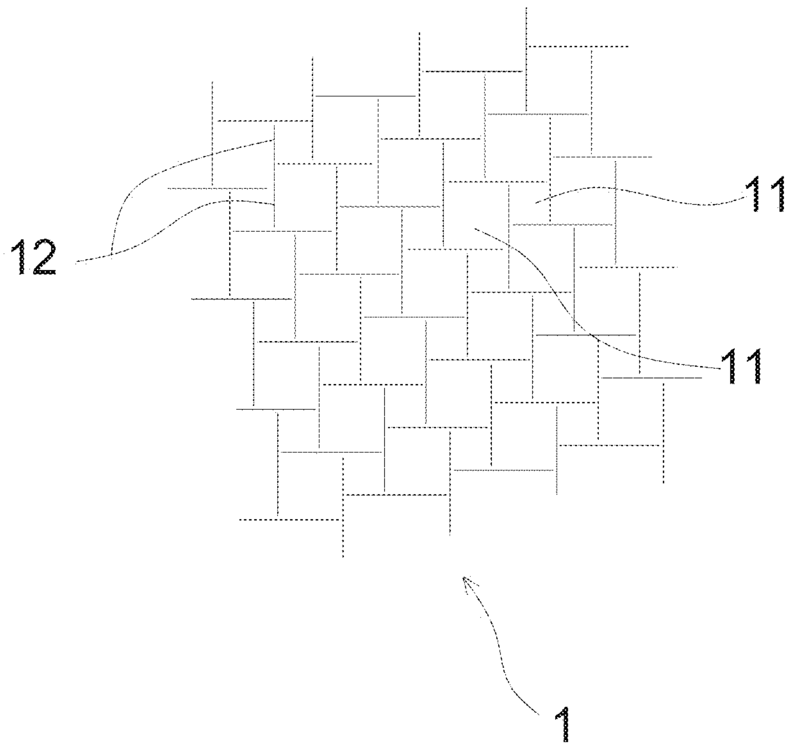
FIG. 13 is a schematic diagram of a sponge according to yet another implementation of the present disclosure.

As shown in FIGS. 9 to 12, a counterclockwise rotating external force is applied to expand the plurality of sponge blocks 11 according to a sequence shown in FIGS. 9 to 12. FIG. 12 is a schematic diagram of the sponge blocks in a fully expanded state, while FIGS. 10 and 11 are schematic diagrams of the sponge blocks during the expanding process. The plurality of sponge blocks 11 and the gaps form a regular geometric pattern, as shown in FIG. 12. Three corners of the triangular sponge block 11 each are connected to one Y-shaped sponge block 11 through the connecting part. Three sides of the Y-shaped sponge block 11 each are connected to one triangular sponge block 11 through the connecting part.

In this embodiment, the sponge body 1 is made of a polyurethane foam material and is suitable for both outdoor and household air mattresses. In other embodiments, the sponge body 1 can be made of other materials according to actual usage needs.

A detailed description of the expanding process of the sponge in the present disclosure is provided below according to FIGS. 9 to 12.

1. Before expanding, as shown in FIG. 9, triangle unit 1 serves as a rotating shaft, connecting points ①, ②, and ③, which are three vertexes of the triangle unit 1, rotate around a center point of the triangle unit 1 in the direction indicated by the arrows. During this process, the Y-shaped blocks 2, 3, and 4 connected to the triangle unit move. As shown in FIG. 10, the sides of the triangle unit gradually form bent gaps (holes).

When the triangle unit 1 rotates to the angle shown in FIG. 11, the bent gaps (holes) become larger, and the Y-shaped blocks 2, 3, and 4 are pushed further.

When the triangle unit 1 rotates to the angle shown in FIG. 12, the bent holes are maximized, and the connecting points ①, ②, and ③ rotate around the triangle unit 1 to reach a fully expanded state. At this point, the number of geometric units per unit area is the smallest, and the area expanded by the sponge blocks 11 is the largest.

Embodiment 3

A further detailed description of the present disclosure is provided below according to the specific embodiments shown in FIGS. 13 to 17.

As shown in FIGS. 13 to 17, a specific sponge includes sponge body 1. The sponge body 1 includes geometric sponge blocks 11 that are connected to each other, specifically, small square sponge blocks 11 and large square sponge blocks 11. Specifically, a plurality of cutting seams are formed on the sponge body 1. Under a normal condition, that is, when there is no external force applied, the sponge body 1 is a whole. That is to say, the sponge blocks 11 of the sponge body 1 are connected to each other, and when there is no external force applied to the sponge body 1, the cutting seams have a very small even zero width. When an external force is applied, some sponge blocks 11 rotate, while the remaining sponge blocks 11 move, to allow the sponge body 1 to expand. When the sponge body 1 is expanded, gaps are formed between the plurality of adjacent sponge blocks 11.

According to FIGS. 13 to 17, the cutting seams divide the sponge body 1 into a plurality of geometric sponge blocks 11. In this embodiment, the cutting seams 12 are fine seams. Every four cutting seams 12 can form one small square (or rectangular) sponge block 11, and every four cutting seams 12 can also enclose one large square sponge block 11. Each small square sponge block 11 is connected to four large square sponge blocks 11, and each large square sponge block 11 is connected to four small square sponge blocks 11. When an external force is applied to the sponge body 1, a combination of regularly arranged small square sponge block 11 and large square sponge blocks 11 is formed.

There are three connecting parts formed between the small square sponge block 11 and the adjacent large square sponge blocks 11, denoted (1, 2, and 3) in FIGS. 13 to 17. When an external force is applied, the sponge blocks 11 expand in all directions, thereby increasing an area. The connecting parts are configured to connect each two adjacent sponge blocks 11.

Figure 14:
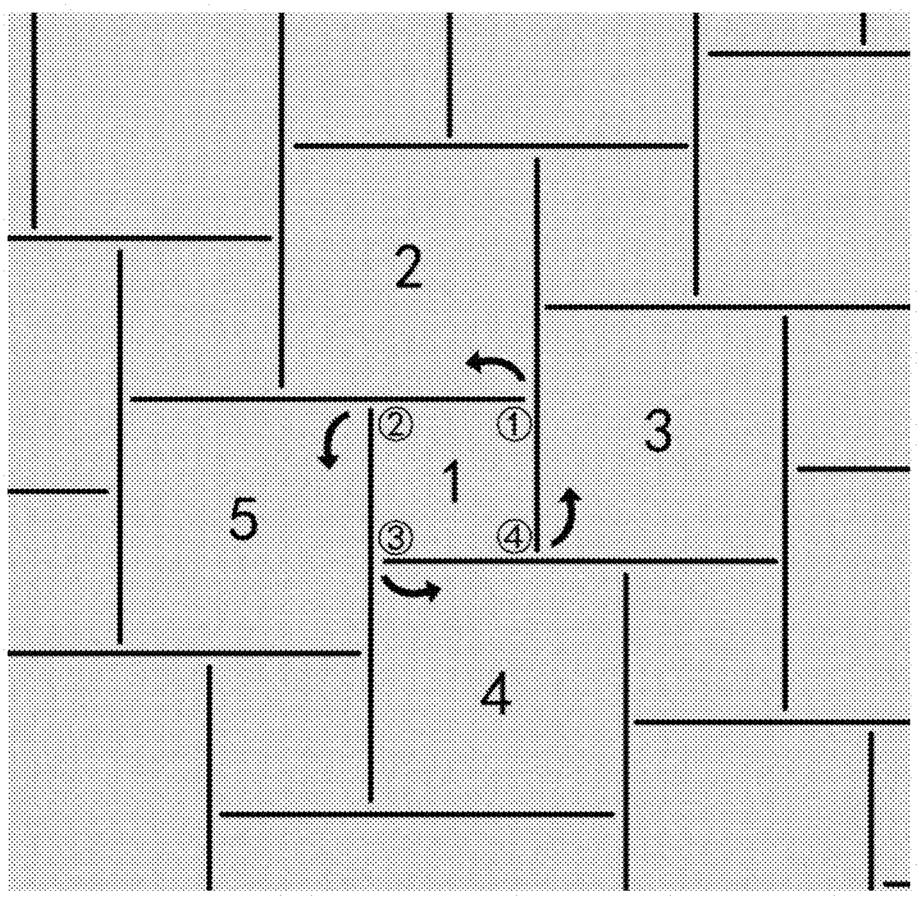
FIGS. 14 to 17 are schematic diagrams of expanding the sponge shown in FIG. 13.
Figure 15:
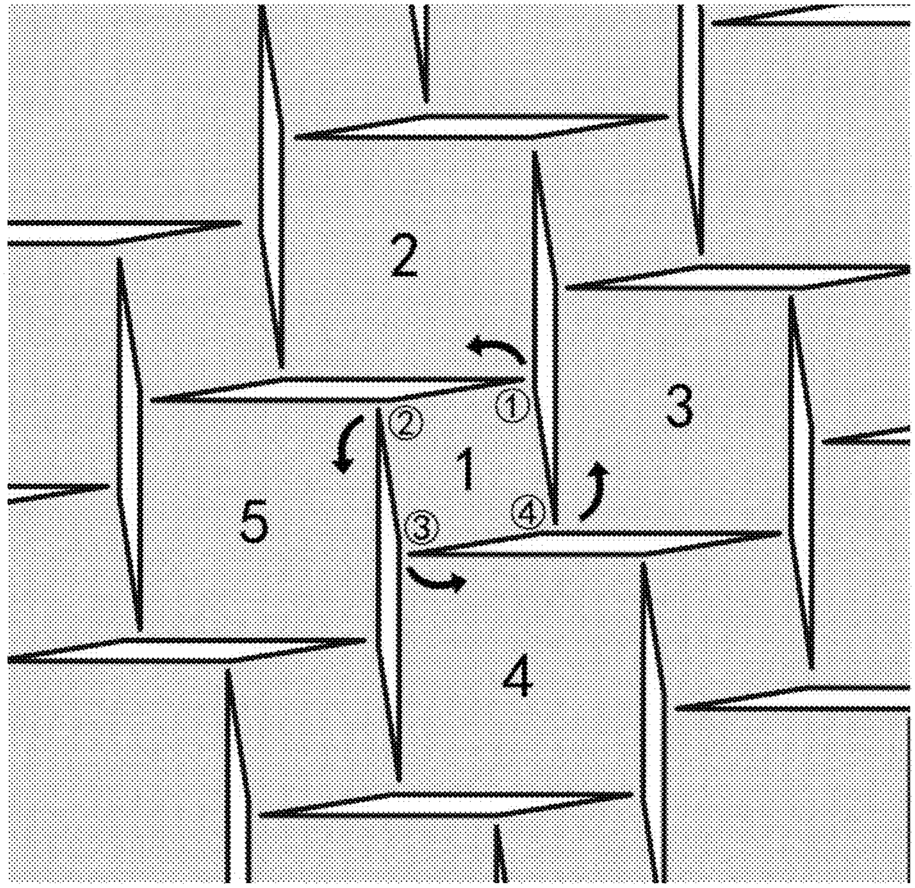
Figure 16:
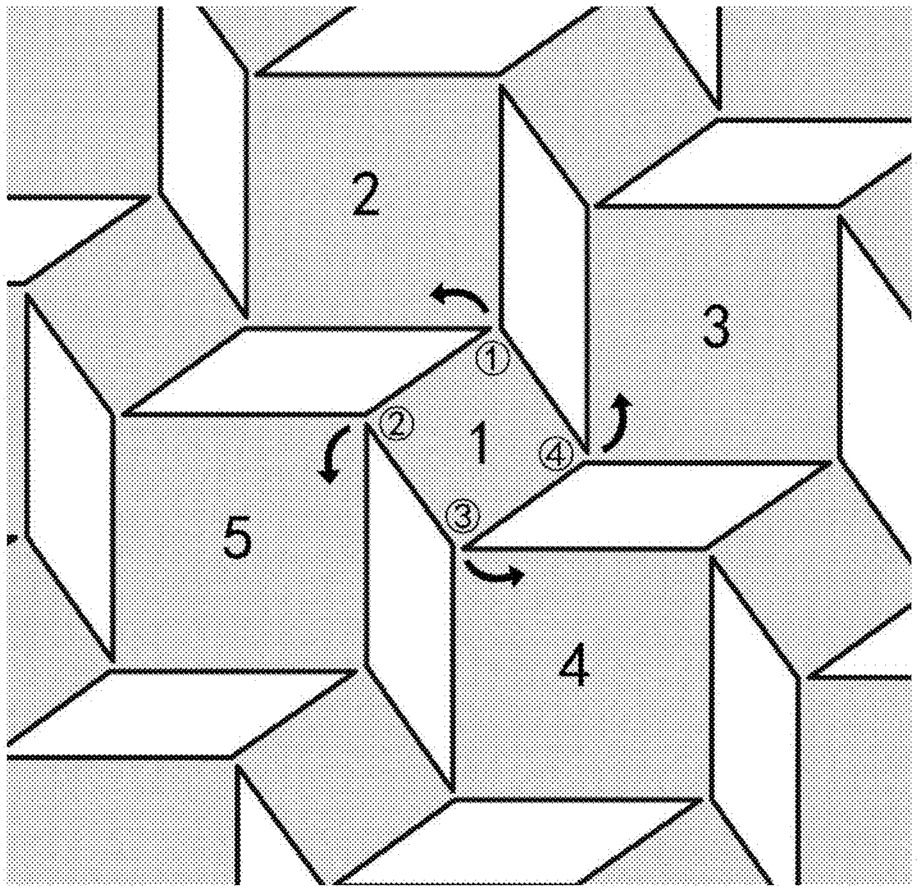
Figure 17:
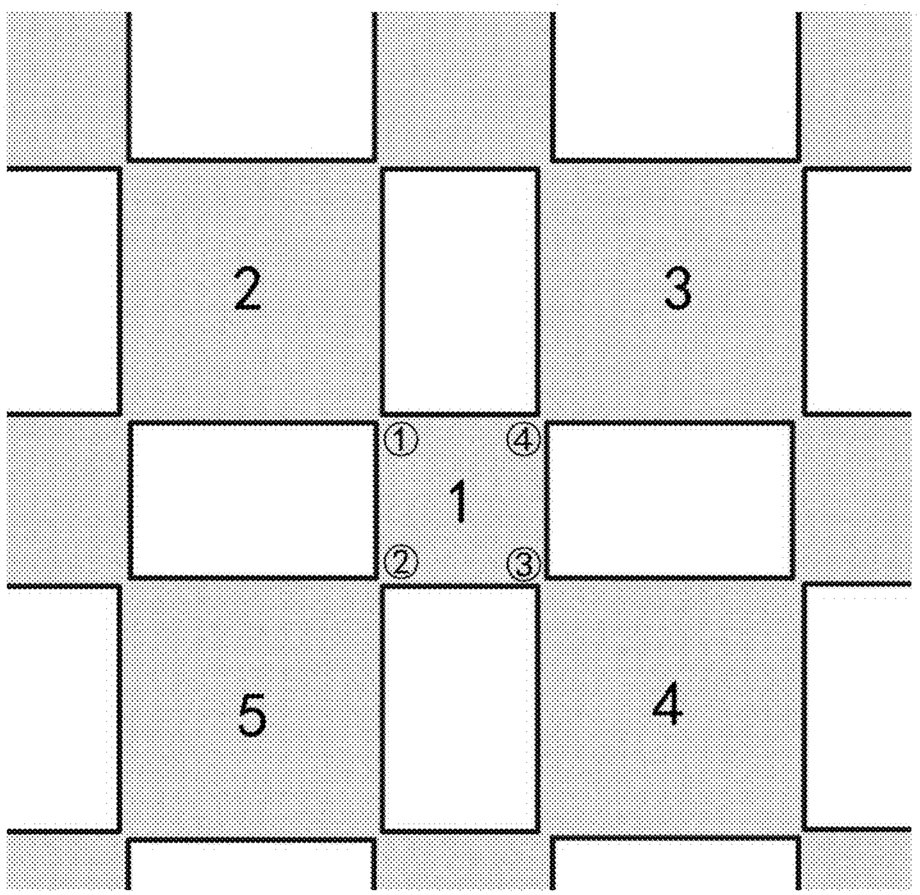

As shown in FIGS. 14 to 17, a counterclockwise rotating external force is applied to expand the plurality of sponge blocks 11 according to a sequence shown in FIGS. 14 to 17. FIG. 17 is a schematic diagram of the sponge blocks in a fully expanded state, while FIGS. 15 and 16 are schematic diagrams of the sponge blocks during the expanding process. The plurality of sponge blocks 11 and the gaps form a regular geometric pattern, as shown in FIG. 17. Four corners of the small square sponge block 11 each are connected to one large square sponge block 11 through the connecting part. Four sides of the large square sponge block 11 each are connected to one small square sponge block 11 through the connecting part.

In this embodiment, the sponge body 1 is made of a polyurethane foam material and is suitable for both outdoor and household air mattresses. In other embodiments, the sponge body 1 can be made of other materials according to actual usage needs.

A detailed description of the expanding process of the sponge in the present disclosure is provided below according to FIGS. 14 to 17.

1. Before expanding, as shown in FIG. 14, small square unit 1 serves as a rotating shaft, connecting points ①, ②, ③, and √4, which are four vertexes of the small square unit 1, rotate around a center point of the small square unit 1 in the direction indicated by the arrows. During this process, the large square blocks 2, 3, 4, and 5 connected to the small square unit move. As shown in FIG. 15, the sides of the small square unit gradually form parallelogram gaps (holes).

When the small square unit 1 rotates to the angle shown in FIG. 16, the parallelogram gaps (holes) become larger, and the large square blocks 2, 3, 4, and 5 are pushed further.

When the small square unit 1 rotates to the angle shown in FIG. 17, the parallelogram holes are maximized, and the connecting points ①, ②, and ③ rotate around the small square unit 1 to reach a fully expanded state. At this point, the number of geometric units per unit area is the smallest, and the area expanded by the sponge blocks 11 is the largest.

Figure 18:
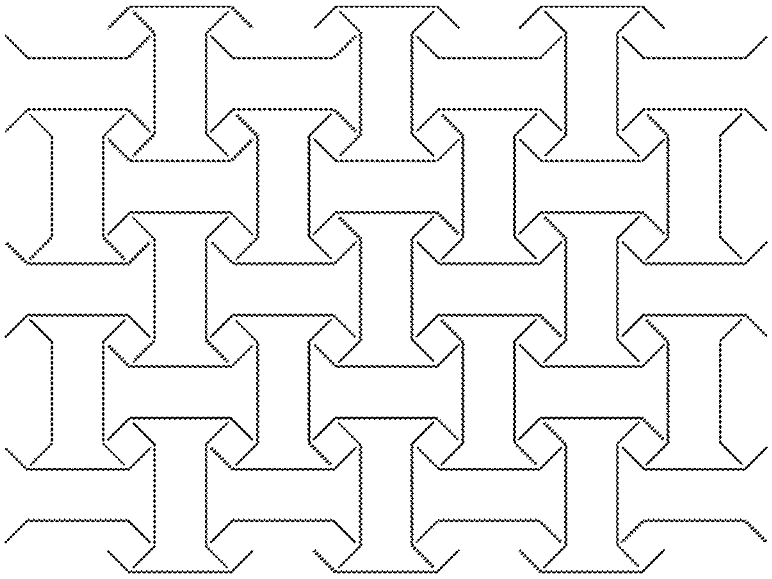
FIG. 18 is a schematic diagram of a sponge according to yet another implementation of the present disclosure.
Figure 19:
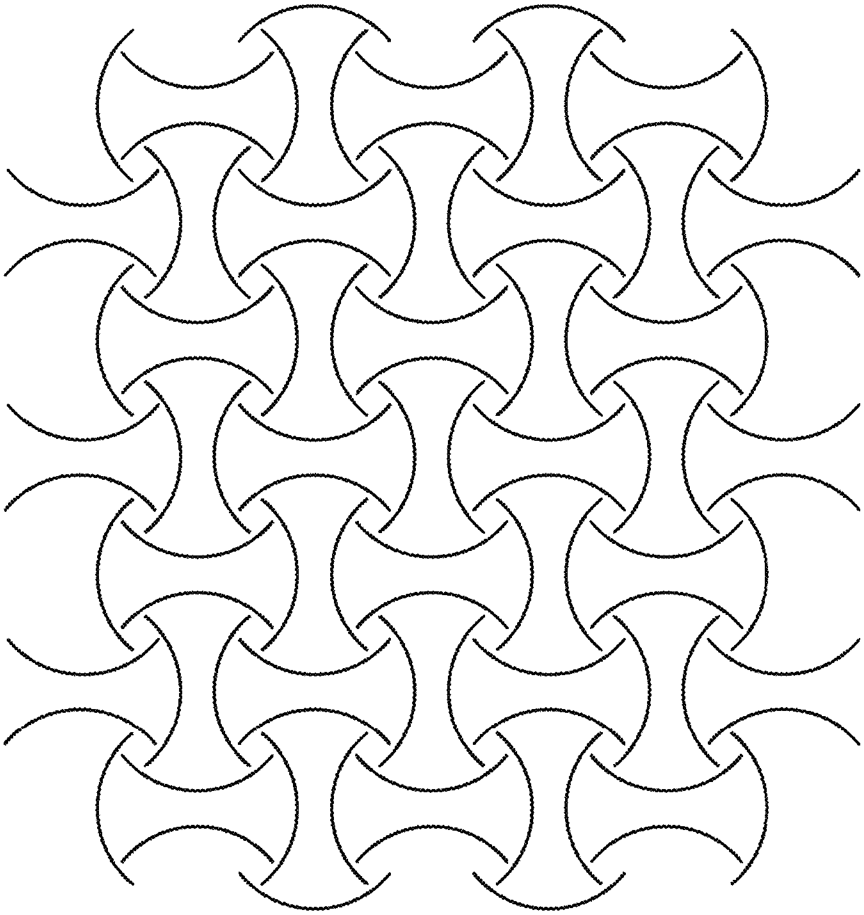
FIG. 19 is a schematic diagram of a sponge according to yet another implementation of the present disclosure.

In summary, the shape and size of the pattern are changed by changing the number and positions of the cutting seams, such that the sponge expands in the XY directions to present hole patterns with different sizes and shapes, as shown in FIGS. 18 and 19.

The focus of the present disclosure is to set the cutting seams 12 on the sponge body 1. When an external force is applied to the sponge body 1, it can cause the cutting seams 12 to rotate, thereby forming the gaps. Finally, the gaps and the sponge blocks form the geometric pattern.

According to the number and positions of cutting seams, the expanded area of the sponge body 1 can be adjusted. The expanded area of the sponge body 1 can become 1.1 to 2 times the original area of the sponge body, with an expansion ratio of 10-100%.

In the present disclosure, the excess waste generated by forming the cutting seams is much smaller than that generated by a conventional vertical punching method, greatly reducing the sponge material and subsequent processing cost, and greatly improving the sponge utilization. In addition, the present disclosure reduces waste generation, thereby reducing carbon emissions in production, and practicing the concept of environmental protection.

The depth of the gap (hole) refers to the thickness of the sponge body 1 or the sponge block 11 (through-hole state). A minimum distance between each two adjacent gaps (holes) in all solutions is 2-8 mm.

As the rotating shaft, the geometric sponge block 11 needs to rotate 30-90° until it is fully expanded. When a mechanical force applied is removed and the sponge is placed on a platform, the sponge in its natural state slightly retracts. But if no force is applied to cause the sponge to gather inward, the sponge will not return to its unexpanded state.

The moved geometric sponge block 11 can be omitted, but the geometric sponge block 11 as the rotating shaft cannot be omitted.

In the present disclosure, the sponge in an expanded state can be bonded to a fabric through a certain bonding process to form an inflatable product. For example, the sponge in a fully expanded state can be applied to an air mattress or a normal mattress. In the present disclosure, the main protected object of the sponge is the sponge body.

Another aspect of the present disclosure provides an expanded sponge. The expanded sponge is bonded onto the fabric to create the gaps between adjacent sponge blocks 11 under the normal condition. Compared with the sponge mentioned above, the expanded sponge includes a fabric, and there are gaps between adjacent sponge blocks 11 under a normal condition. The normal condition refers to a situation where there is no external force applied.

When the expanded sponge is bonded onto the fabric, the gaps are formed, which are equivalent to the holes formed by a conventional vertical punching method.

In addition, this embodiment further provides an air mattress, including an air mattress body and an expanded sponge. The sponge is filled in the air mattress body, and the air mattress body is matched with the gaps to form a pattern. The air mattress is only a specific embodiment of the sponge application scenario of the present disclosure, and the sponge can also be applied to other products (such as seat cushions and yoga mats).

Another aspect of the present disclosure provides a sponge fabrication process, including the following steps.

S1. A cutting device and a cutting tool are adjusted, and the cutting tool is mounted on the cutting device.

S2. An entire piece of sponge is placed under the cutting device, and the sponge is cut by the cutting device.

S3. The plurality of cutting seams are formed on the sponge body 1 after cutting.

In some implementations, the sponge fabrication process further includes the following steps:

S4. An external force is applied to the sponge body 1, such that the sponge body 1 is expanded, and the gaps are formed between adjacent sponge blocks 11.

S5. The expanded sponge body 1 is bonded onto a fabric.

In the present disclosure, the sponge is provided with cutting seams. When an external force is applied, the sponge is expanded, and the gaps are formed, which are equivalent to the holes formed by a conventional vertical punching method.

Compared to an air mattress that requires punching on the entire sponge, the air mattress in the present disclosure does not require punching and only requires cutting to form holes. After the sponge of the present disclosure is combined with the air mattress body, a pattern is formed. The present disclosure avoids waste materials formed by punching holes, and is environmentally friendly.

The present disclosure is not limited to the above optional embodiments, and those skilled in the art may derive other products in various forms under the enlightenment of the present disclosure. However, regardless of any changes in the shape or structure, any technical solutions falling within the scope of the claims of the present disclosure should fall within the protection scope of the present disclosure.

What is claimed is:

1. A sponge, comprising a sponge body, wherein the sponge body comprises a plurality of geometric sponge blocks that are connected to each other; the sponge body is a whole under a normal condition; and when an external force is applied, some sponge blocks rotate, while the remaining sponge blocks move, to allow the sponge body to expand; after the external force is applied, the movement of the remaining sponge blocks due to application of the external force forms holes between the plurality of adjacent sponge blocks, and the holes vertically penetrate the sponge body.

2. The sponge according to claim 1, wherein the sponge body is provided with a plurality of cutting seams; the sponge body is divided into the plurality of geometric sponge blocks through the plurality of cutting seams; and at least one connecting part is provided between each two adjacent sponge blocks.

3. The sponge according to claim 2, wherein when the external force is applied to expand the sponge body, the plurality of sponge blocks and the holes form a regular geometric pattern.

4. The sponge according to claim 3, wherein the sponge is made of a polyurethane foam material.

5. An expanded sponge, comprising a fabric and the sponge according to claim 1, wherein the expanded sponge is bonded onto the fabric to create the holes between adjacent sponge blocks under the normal condition.

6. The expanded sponge according to claim 5, wherein the sponge body has a density of 14-50 $kg/m^3$.

7. The expanded sponge according to claim 6, wherein the sponge body has a thickness of 2.5-25 cm.

8. An air mattress, comprising an air mattress body and the expanded sponge according to claim 5, wherein the sponge is filled in the air mattress body, and the air mattress body is provided with a pattern.

9. A fabrication process of the sponge according to claim 4, comprising the following steps:

S1: adjusting a cutting device and a cutting tool, and mounting the cutting tool on the cutting device;

S2: placing an entire piece of sponge under the cutting device, and cutting the sponge by the cutting device; and S3: forming the plurality of cutting seams on the sponge body after cutting.

10. The fabrication process according to claim 9, further comprising the following steps:

S4: applying the external force to the sponge body, such that the sponge body is expanded to obtain an expanded sponge body, and the holes are formed between adjacent sponge blocks; and S5: bonding the expanded sponge body onto a fabric.

11. The expanded sponge according to claim 5, wherein the sponge body is provided with a plurality of cutting seams; the sponge body is divided into the plurality of geometric sponge blocks through the plurality of cutting seams; and at least one connecting part is provided between each two adjacent sponge blocks.

12. The expanded sponge according to claim 11, wherein when the external force is applied to expand the sponge body, the plurality of sponge blocks and the holes form a regular geometric pattern.

13. The expanded sponge according to claim 12, wherein the sponge is made of a polyurethane foam material.

* * * * *